(12) United States Patent
Carty et al.

(10) Patent No.: US 9,904,832 B1
(45) Date of Patent: Feb. 27, 2018

(54) PRICE TAG ASSEMBLY

(71) Applicants: Carlos Carty, Miami, FL (US); Luis Carty, Miami, FL (US)

(72) Inventors: Carlos Carty, Miami, FL (US); Luis Carty, Miami, FL (US)

( * ) Notice: Subject to any disclaimer, the term of this patent is extended or adjusted under 35 U.S.C. 154(b) by 0 days.

(21) Appl. No.: 15/597,328

(22) Filed: May 17, 2017

(51) Int. Cl.
G06K 7/14 (2006.01)
G06K 19/06 (2006.01)
G06K 19/077 (2006.01)

(52) U.S. Cl.
CPC ..... *G06K 7/1413* (2013.01); *G06K 19/06028* (2013.01); *G06K 19/07758* (2013.01)

(58) Field of Classification Search
None
See application file for complete search history.

(56) References Cited

U.S. PATENT DOCUMENTS

| 5,019,811 | A | 5/1991 | Olsson et al. |
| 5,111,196 | A | 5/1992 | Hunt |
| D337,999 | S | 8/1993 | Garvin |
| 6,570,492 | B1 | 5/2003 | Peratoner |
| 6,859,786 | B1 | 2/2005 | Goodwin, III et al. |
| D574,438 | S | 8/2008 | Mori |
| 7,584,888 | B2 | 9/2009 | Stephenson et al. |
| D612,852 | S | 3/2010 | Bancolini |
| 8,009,348 | B2 | 8/2011 | Zehner et al. |
| 8,054,218 | B2 | 11/2011 | Gelbman |
| 2011/0290889 | A1* | 12/2011 | Tamburrini ........ G06K 7/10881 235/470 |
| 2012/0326849 | A1* | 12/2012 | Relihan ................ G07G 1/145 340/10.6 |
| 2016/0048907 | A1* | 2/2016 | Park ...................... G06Q 30/02 345/634 |
| 2016/0055357 | A1* | 2/2016 | Hicks ................ G06K 7/10881 235/383 |

* cited by examiner

Primary Examiner — Kristy A Haupt

(57) ABSTRACT

A price tag assembly includes a price tag that may be attached to a shelf in a retail environment thereby facilitating the price tag to display a price of a corresponding item. A receiving unit is coupled to the price tag and the receiving unit selectively receives pricing information. The receiving unit displays a price of the corresponding item corresponding to the pricing information. In this way the receiving unit selectively alters the price displayed in accordance with the pricing information. A transmitting unit is provided and the transmitter is in discrete wireless communication with the receiving unit. In this way the transmitting unit selectively communicates the pricing information to the receiving unit. The transmitting unit is selectively placed in electrical communication with an extrinsic database thereby facilitating the transmitting unit to download the pricing information.

12 Claims, 4 Drawing Sheets

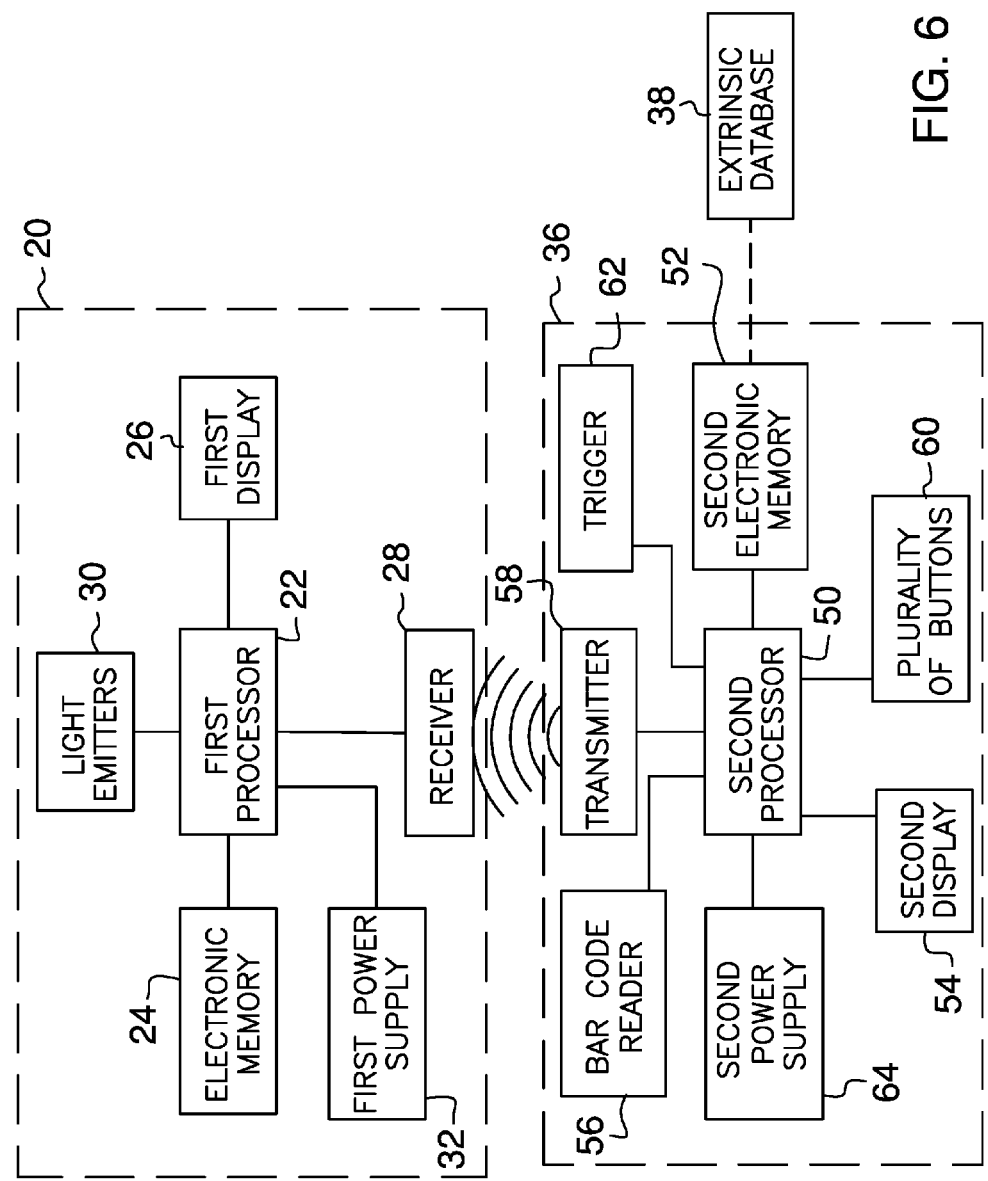

PRICE TAG ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to pricing devices and more particularly pertains to a new pricing device for electronically updating prices displayed on price tags.

BRIEF SUMMARY OF THE INVENTION

An embodiment of the disclosure meets the needs presented above by generally comprising a price tag that may be attached to a shelf in a retail environment thereby facilitating the price tag to display a price of a corresponding item. A receiving unit is coupled to the price tag and the receiving unit selectively receives pricing information. The receiving unit displays a price of the corresponding item corresponding to the pricing information. In this way the receiving unit selectively alters the price displayed in accordance with the pricing information. A transmitting unit is provided and the transmitter is in discrete wireless communication with the receiving unit. In this way the transmitting unit selectively communicates the pricing information to the receiving unit. The transmitting unit is selectively placed in electrical communication with an extrinsic database thereby facilitating the transmitting unit to download the pricing information.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a schematic view of an embodiment of the disclosure.

DETAILED DESCRIPTION OF THE INVENTION

Figure 1:
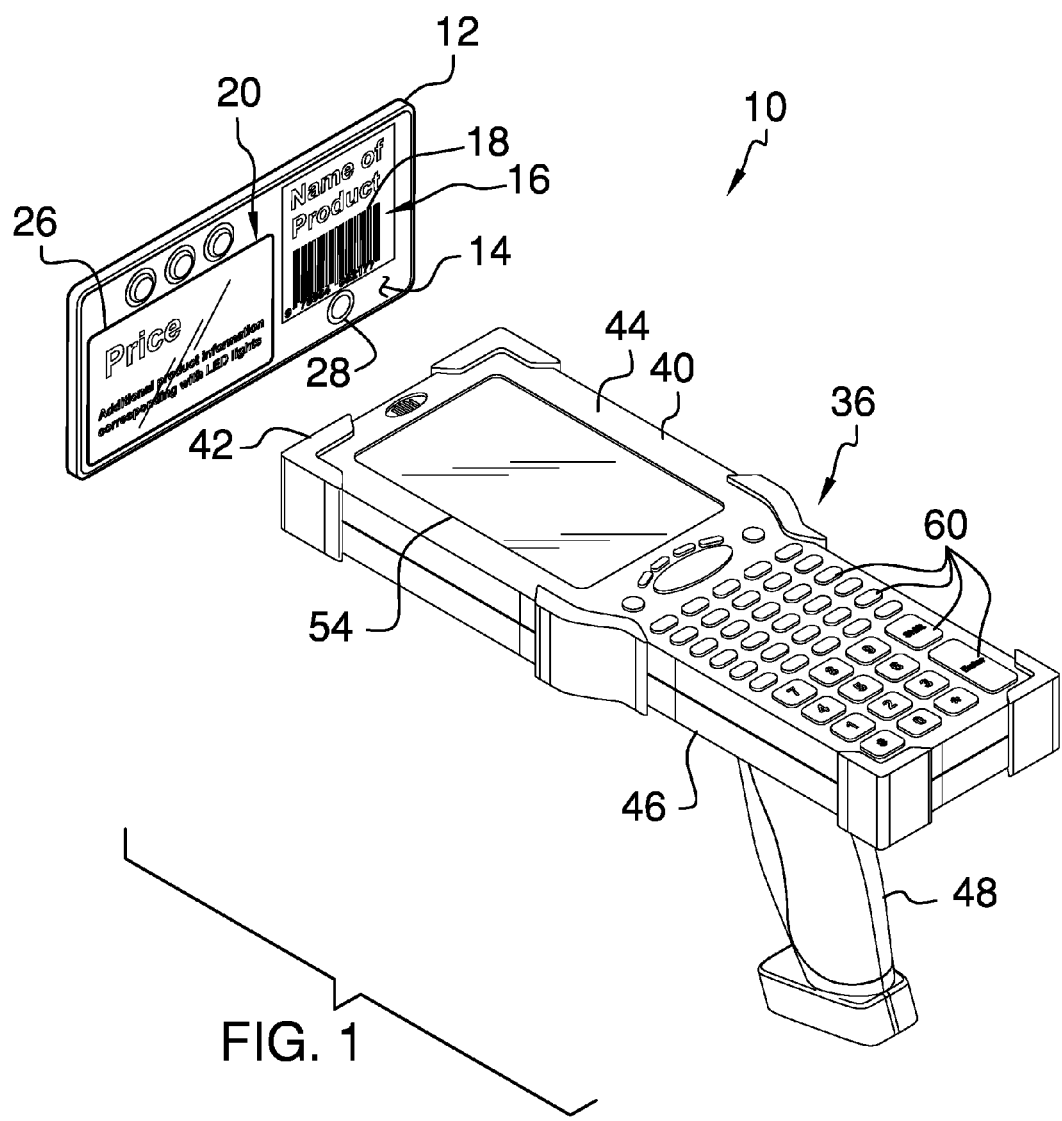
FIG. 1 is a perspective view of a price tag assembly according to an embodiment of the disclosure.
Figure 2:
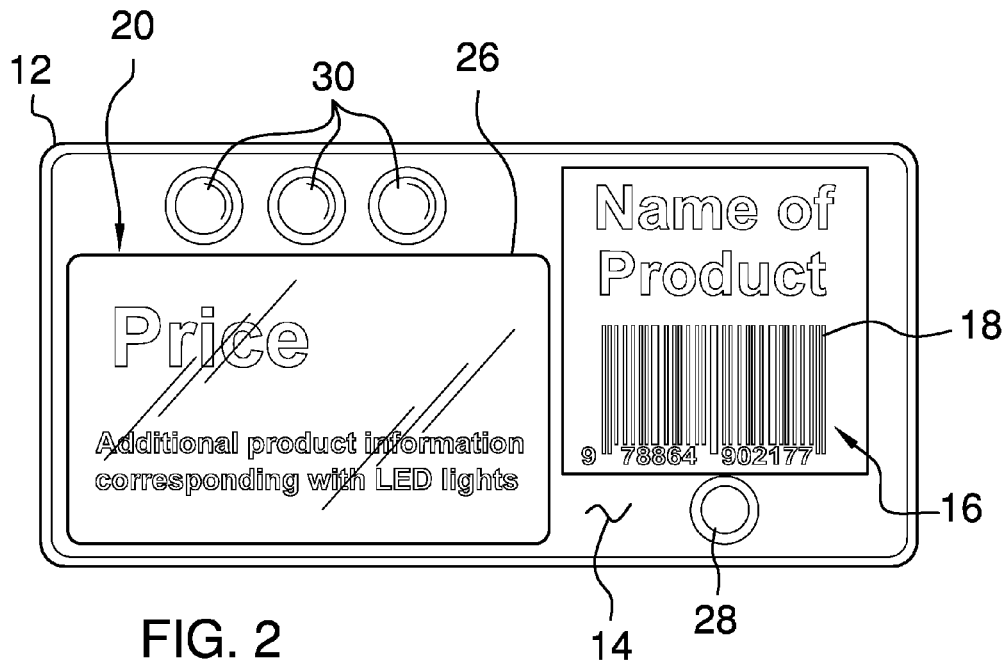
FIG. 2 is a front view of price tag of an embodiment of the disclosure.
Figure 3:
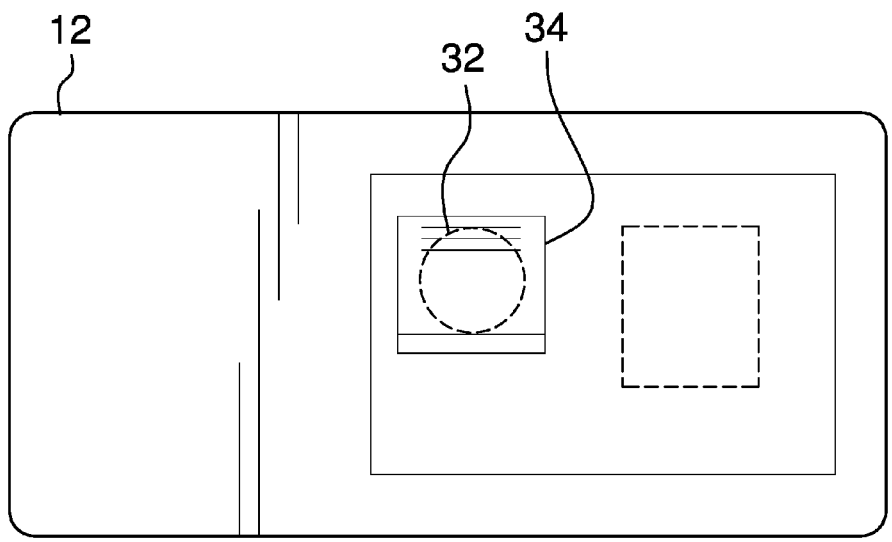
FIG. 3 is a back view of price tag of an embodiment of the disclosure.
Figure 4:
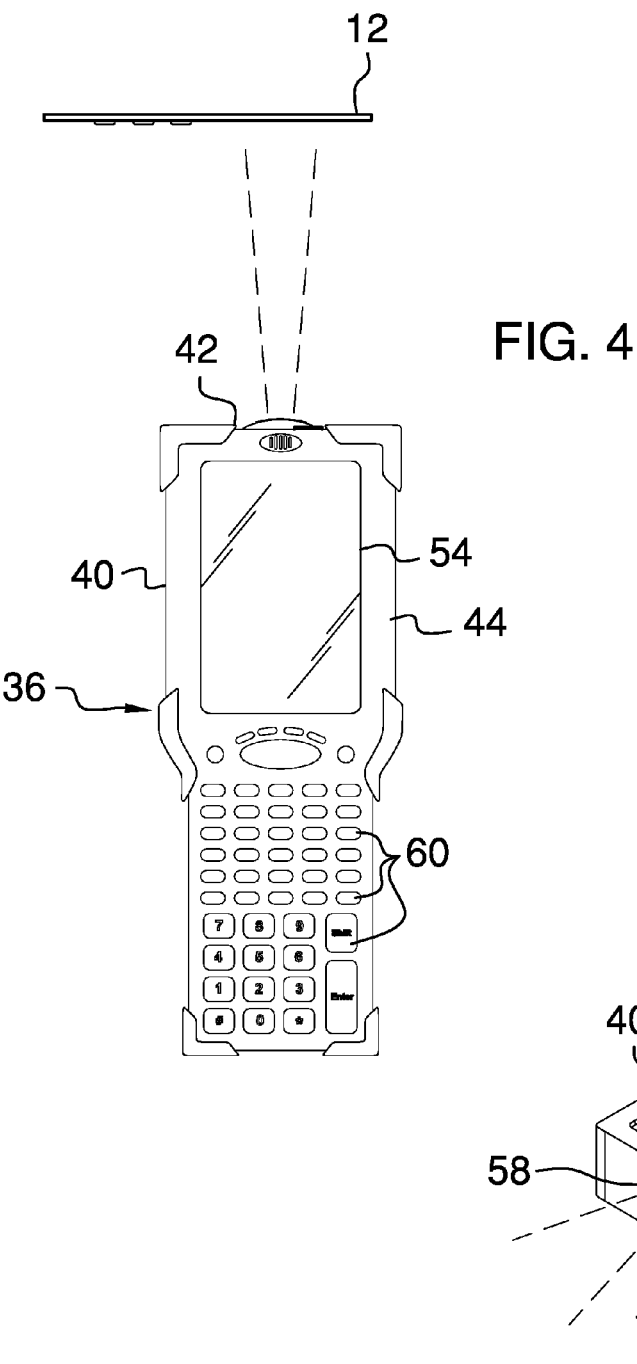
FIG. 4 is a top perspective in-use view of an embodiment of the disclosure.
Figure 5:
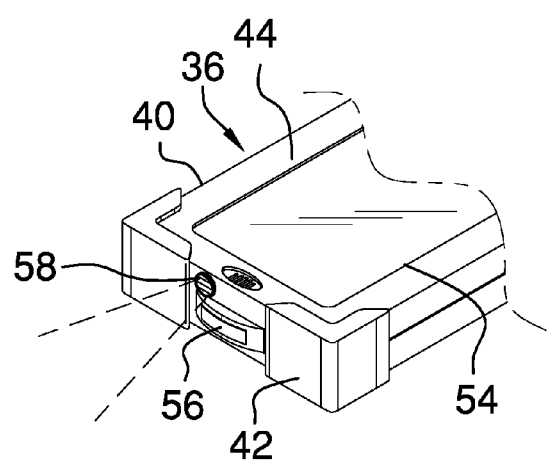
FIG. 5 is a front perspective view of transmitting unit of an embodiment of the disclosure.

With reference now to the drawings, and in particular to FIGS. 1 through 6 thereof, a new pricing device embodying the principles and concepts of an embodiment of the disclosure and generally designated by the reference numeral 10 will be described.

As best illustrated in FIGS. 1 through 6, the price tag assembly 10 generally comprises a price tag 12 that is selectively attached to a shelf in a retail environment. In this way the price tag 12 may display a price of a corresponding item. The price tag 12 has a first surface 14 and indicia 16 are printed on the first surface 14. The indicia 16 comprise a bar code 18.

A receiving unit 20 is coupled to the price tag 12 and the receiving unit 20 selectively receives pricing information. The receiving unit 20 displays a price of the corresponding item corresponding to the pricing information. Moreover, the receiving unit 20 selectively alters the price displayed in accordance with the pricing information. In this way the receiving unit 20 displays a real time price with respect to sales, discounts or other price alterations.

The receiving unit 20 comprises a first processor 22 that is positioned within the price tag 12. The first processor 22 may be an electronic processor or the like. A first electronic memory 24 is positioned within the price tag 12 and the first electronic memory 24 is electrically coupled to the first processor 22. The first electronic memory 24 stores pricing data and the first electronic memory 24 may comprise RAM memory or the like.

A first display 26 is coupled to the first surface 14 of the price tag 12 such that the first display 26 is visible. The first display 26 is electrically coupled to the first processor 22 and the first display 26 receives the pricing data from the first electronic memory 24. The first display 26 displays indicia that comprise pricing information corresponding to the pricing data. The first display 26 may be an LED display or other flat screen display.

A receiver 28 is provided and the receiver 28 is coupled to the first surface 14 of the price tag 12. The receiver 28 is electrically coupled to the first processor 22 and the receiver 28 may comprise an infra-red receiver 28 or the like. A plurality of light emitters 30 is each coupled to the first surface 14 of the price tag 12 to selectively emit light outwardly therefrom. Each of the light emitters 30 is electrically coupled to the first processor 22 and each of the light emitters 30 may comprise an LED or the like.

Additionally, each of the light emitters 30 may emit a unique color of light with respect to each other. The plurality of light emitters 30 may include a first light emitter, a second light emitter and a third light emitter. The first light emitter may be turned on when the first processor 22 receives pricing information pertaining to a new item in the retail environment. In this way shoppers may be notified that the item corresponding to the price tag 12 is a new item. The second light emitter may be turned on when the first processor 22 receives pricing information pertaining to a sale price. Thus, the shoppers may be notified that the item corresponding to the price tag 12 is on sale. The third light emitter may be turned on when the first processor 22 receives pricing information pertaining to a closeout price. In this way the shoppers may be notified that the item corresponding to the price tag 12 is on closeout.

A first power supply 32 is provided and the first power supply 32 positioned within the price tag 12. The first power supply 32 is electrically coupled to the first processor 22 and the first power supply 32 comprises at least one battery. A battery cover 34 is removably coupled to the price tag 12 and the first power supply 32 is positioned beneath the battery cover 34. The price tag 12 may be one of a plurality of price tags 12 and each of the price tags 12 may include the receiving unit 20. The plurality of price tags 12 may be distributed around the retail environment to corresponding to placement of inventory throughout the retail environment.

A transmitting unit 36 is provided and the transmitting unit 36 is selectively manipulated by an employee of the retail environment. The transmitting unit 36 is in discrete wireless communication with the receiving unit 20 to communicate the pricing information to the receiving unit 20. Moreover, the transmitting unit 36 is selectively placed in electrical communication with an extrinsic database 38. In this way the transmitting unit 36 may download the pricing information from the extrinsic database 38. The extrinsic database 38 may be a computer in the retail environment or other digital information storage device.

The transmitting unit 36 comprises a gun 40 that has a front side 42, a top side 44 and a bottom side 46. A handle 48 is coupled to and extends downwardly from the bottom side 46 and the handle 48 is selectively gripped. A second processor 50 is positioned within the gun 40 and the second processor 50 may be an electronic processor or the like.

A second electronic memory 52 is positioned within the gun 40 and the second electronic memory 52 is electrically coupled to the second processor 50. The second electronic memory 52 is selectively placed in electrical communication with the extrinsic database 38 to receive pricing data from the extrinsic database 38. Moreover, the second electronic memory 52 stores the pricing data corresponding to the bar code on the price tag 12. The second electronic memory 52 may comprise RAM memory or the like.

A port may be coupled to the gun 40 and the port may be electrically coupled to the second processor 50. The port may have a data cord selectively electrically coupled thereto and the data cord may be electrically coupled to the extrinsic database 38. In this way the second electronic memory 52 may receive the pricing data. Additionally, the port may be a usb port or the like.

A second display 54 is coupled to the top side 44 of the gun 40 such that the second display 54 is visible. The second display 54 is electrically coupled to the second processor 50. Moreover, the second display 54 displays indicia corresponding to operational parameters of the second processor 50. The second display 54 may be an LCD display or the like.

A bar code reader 56 is coupled to the front side 42 of the gun 40 and the bar code reader 56 selectively emits radiation outwardly therefrom. The radiation emitted by the bar code reader 56 may be infra-red light, laser light or any other frequency of radiation commonly used to read bar codes. The bar code reader 56 is electrically coupled to the second processor 50 such that the second processor 50 receives data encoded into the barcode when the bar code reader 56 reads the bar code. The data encoded into the barcode may include product information pertaining to the item and a predetermined store code.

A transmitter 58 is coupled to the front side 42 of the gun 40 and the transmitter 58 selectively emits radiation outwardly therefrom. The transmitter 58 is electrically coupled to the second processor 50 and the radiation emitted by the transmitter 58 may be infra-red light. In this way the transmitter 58 is in discrete wireless communication with the receiver 28 to communicate the pricing information to the receiver 28. Moreover, the infra-red light inhibits hacking commonly associated with a wireless local network and other internet based communication. In this way the transmitter 58 enhances security with respect to the pricing information.

A plurality of buttons 60 is provided and each of the buttons 60 is coupled to the top side 44 of the gun 40. Each of the buttons 60 is electrically coupled to the second processor 50 to control operational parameters of the second processor 50. A trigger 62 is coupled to the handle 48 and the trigger 62 is selectively manipulated. The trigger 62 is electrically coupled to the second processor 50 to turn each of the transmitter 58 and the bar code reader 56 on and off. A second power supply 64 is positioned within the gun 40 and the second power supply 64 is electrically coupled to the second processor 50. The second power supply 64 comprises at least one battery.

In use, the pricing data in the extrinsic database 38 is predetermined to correspond with sales, inventory and other information relating to the daily operations of the retail environment. The gun 40 is manipulated and the gun 40 is pointed at the bar code 18 on a selected price tag 12. The trigger 62 is manipulated to turn the bar code reader 56 on and the bar code reader 56 reads the bar code 18 on the selected price tag 12. The data encoded into the bar code 18 is communicated to the second processor 50 and the second processor 50 retrieves the pricing data in the second electronic memory 52 pertaining to the bar code 18.

The trigger 62 is manipulated to turn the transmitter 58 on and the transmitter 58 transmits the pricing data to the receiver 28. The pricing data is communicated to the first processor 22 and the first display 26 displays the pricing data. Additionally, the first light emitter is turned on when the pricing data indicates a new item. The second light emitter is turned on when the pricing data indicates a sale price. Finally, the third light emitter is turned on when the pricing data indicates a closeout price. The gun 40 is directed at each price tag 12 in the store and the pricing data is updated for each of the price tags 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A price tag assembly being configured to dynamically display prices of goods in a retail environment, said assembly comprising:
   a price tag being configured to be attached to a shelf in a retail environment thereby facilitating said price tag to display a price of a corresponding item;
   a receiving unit being coupled to said price tag, said receiving unit selectively receiving pricing information, said receiving unit displaying a price of the corresponding item corresponding to said pricing information, said receiving unit selectively altering the price displayed in accordance with the pricing information; and
   a transmitting unit being configured to be manipulated, said transmitting unit being in discrete wireless communication with said receiving unit such that said transmitting unit selectively communicates the pricing information to said receiving unit, said transmitting unit being configured to be selectively placed in electrical communication with an extrinsic database thereby facilitating said transmitting unit to download the pricing information, said transmitting unit comprises
   a gun having a front side, a top side and a bottom side,
   a handle being coupled to and extending downwardly from said bottom side wherein said handle is configured to be gripped,
   a second processor being positioned within said gun,
   a second electronic memory being positioned within said gun, said second electronic memory being electrically coupled to said second processor, said second electronic memory being configured to be selectively placed in electrical communication with the extrinsic database thereby facilitating said second electronic memory to receive pricing data from the extrinsic database, said second electronic memory storing said pricing data corresponding to a bar code on said price tag, and
   a transmitter being coupled to said front side of said gun wherein said transmitter is configured to selectively emit radiation outwardly therefrom, said transmitter being electrically coupled to said second processor, said transmitter being in discrete wireless communication with said receiver such that said transmitter communicates said pricing information to said receiver.

2. The assembly according to claim 1, wherein said receiving unit comprises:
   a first processor being positioned within said price tag; and
   a first electronic memory being positioned within said price tag, said first electronic memory being electrically coupled to said first processor, said first electronic memory storing pricing data.

3. The assembly according to claim 2, further comprising a first display being coupled to a first surface of said price tag wherein said first display is configured to be visible, said first display being electrically coupled to said first processor such that said first display receives said pricing data from said first electronic memory, said first display displaying indicia, said indicia comprising pricing information corresponding to said pricing data.

4. The assembly according to claim 2, further comprising a receiver being coupled to a first surface of said price tag, said receiver being electrically coupled to said first processor.

5. The assembly according to claim 2, further comprising a plurality of light emitters, each of said light emitters being coupled to a first surface of said price tag wherein each of said light emitters is configured to emit light outwardly therefrom, each of said light emitters being electrically coupled to said first processor.

6. The assembly according to claim 2, further comprising a first power supply being positioned within said price tag, said first power supply being electrically coupled to said first processor, said first power supply comprising at least one battery.

7. The assembly according to claim 1, further comprising a second display being coupled to said top side of said gun wherein said second display is configured to be visible, said second display being electrically coupled to said second processor, said second display displaying indicia corresponding to operational parameters of said second processor.

8. The assembly according to claim 7, further comprising a bar code reader being coupled to said front side of said gun wherein said bar code reader is configured to selectively emit radiation outwardly therefrom, said bar code reader being electrically coupled to said second processor such that said second processor receives data encoded into said barcode when said bar code reader reads said bar code.

9. The assembly according to claim 7, further comprising a plurality of buttons, each of said buttons being coupled to said top side of said gun wherein each of said buttons is configured to be manipulated, each of said buttons being electrically coupled to said second processor such that said plurality of buttons controls operational parameters of said second processor.

10. The assembly according to claim 7, further comprising:
   a bar code reader; and
   a trigger being coupled to said handle wherein said trigger is configured to be manipulated, said trigger being electrically coupled to said second processor such that said trigger selectively turns each of said transmitter and said bar code reader on and off.

11. The assembly according to claim 7, further comprising a second power supply being positioned within said gun, said second power supply being electrically coupled to said second processor, said second power supply comprising at least one battery.

12. A price tag assembly being configured to dynamically display prices of goods in a retail environment, said assembly comprising:
- a price tag being configured to be attached to a shelf in a retail environment thereby facilitating said price tag to display a price of a corresponding item, said price tag having a first surface, said first surface having indicia being printed thereon, said indicia comprising a bar code;
- a receiving unit being coupled to said price tag, said receiving unit selectively receiving pricing information, said receiving unit displaying a price of the corresponding item corresponding to said pricing information, said receiving unit selectively altering the price displayed in accordance with the pricing information, said receiving unit comprising:
  - a first processor being positioned within said price tag,
  - a first electronic memory being positioned within said price tag, said first electronic memory being electrically coupled to said first processor, said first electronic memory storing pricing data,
  - a first display being coupled to said first surface of said price tag wherein said first display is configured to be visible, said first display being electrically coupled to said first processor such that said first display receives said pricing data from said first electronic memory, said first display displaying indicia, said indicia comprising pricing information corresponding to said pricing data,
  - a receiver being coupled to said first surface of said price tag, said receiver being electrically coupled to said first processor,
  - a plurality of light emitters, each of said light emitters being coupled to said first surface of said price tag wherein each of said light emitters is configured to emit light outwardly therefrom, each of said light emitters being electrically coupled to said first processor, and
  - a first power supply being positioned within said price tag, said first power supply being electrically coupled to said first processor, said first power supply comprising at least one battery; and
- a transmitting unit being configured to be manipulated, said transmitting unit being in discrete wireless communication with said receiving unit such that said transmitting unit selectively communicates the pricing information to said receiving unit, said transmitting unit being configured to be selectively placed in electrical communication with an extrinsic database thereby facilitating said transmitting unit to download the pricing information, said transmitting unit comprising:
  - a gun having a front side, a top side and a bottom side,
  - a handle being coupled to and extending downwardly from said bottom side wherein said handle is configured to be gripped,
  - a second processor being positioned within said gun,
  - a second electronic memory being positioned within said gun, said second electronic memory being electrically coupled to said second processor, said second electronic memory being configured to be selectively placed in electrical communication with the extrinsic database thereby facilitating said second electronic memory to receive said pricing data from the extrinsic database, said second electronic memory storing said pricing data corresponding to said bar code on said price tag,
  - a second display being coupled to said top side of said gun wherein said second display is configured to be visible, said second display being electrically coupled to said second processor, said second display displaying indicia corresponding to operational parameters of said second processor,
  - a bar code reader being coupled to said front side of said gun wherein said bar code reader is configured to selectively emit radiation outwardly therefrom, said bar code reader being electrically coupled to said second processor such that said second processor receives data encoded into said barcode when said bar code reader reads said bar code,
  - a transmitter being coupled to said front side of said gun wherein said transmitter is configured to selectively emit radiation outwardly therefrom, said transmitter being electrically coupled to said second processor, said transmitter being in discrete wireless communication with said receiver such that said transmitter communicates said pricing information to said receiver,
  - a plurality of buttons, each of said buttons being coupled to said top side of said gun wherein each of said buttons is configured to be manipulated, each of said buttons being electrically coupled to said second processor such that said plurality of buttons controls operational parameters of said second processor,
  - a trigger being coupled to said handle wherein said trigger is configured to be manipulated, said trigger being electrically coupled to said second processor such that said trigger selectively turns each of said transmitter and said bar code reader on and off, and
  - a second power supply being positioned within said gun, said second power supply being electrically coupled to said second processor, said second power supply comprising at least one battery.

* * * * *